United States Patent
Yu et al.

(10) Patent No.: US 8,027,159 B2
(45) Date of Patent: Sep. 27, 2011

(54) FIXING MECHANISM FOR FIXING A REMOVABLE MODULE OF AN ELECTRONIC DEVICE

(75) Inventors: Liang Yu, Taipei Hsien (TW); Cheng-Hsiang Chuang, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 274 days.

(21) Appl. No.: 12/464,112

(22) Filed: May 12, 2009

(65) Prior Publication Data

US 2010/0033919 A1 Feb. 11, 2010

(30) Foreign Application Priority Data

Aug. 7, 2008 (TW) .............................. 97214148 U

(51) Int. Cl.
*G06F 1/16* (2006.01)
(52) U.S. Cl. ......... 361/679.58; 361/679.33; 361/679.37; 312/223.1; 312/223.2
(58) Field of Classification Search ............. 361/679.31, 361/679.32, 679.37, 679.57, 679.58
See application file for complete search history.

(56) References Cited

U.S. PATENT DOCUMENTS

| | | | | | |
|---|---|---|---|---|---|
| 2,722,579 | A | * | 11/1955 | Rohacs | 200/434 |
| 4,286,132 | A | * | 8/1981 | Greenwald | 200/456 |
| D316,853 | S | * | 5/1991 | Dickey | D14/356 |
| 5,130,892 | A | * | 7/1992 | Satou | 361/679.55 |
| 5,363,273 | A | * | 11/1994 | Ma | 361/679.37 |
| 5,452,179 | A | * | 9/1995 | Sasaki | 361/679.32 |
| D368,258 | S | * | 3/1996 | Ojeda | D14/368 |
| 5,506,749 | A | * | 4/1996 | Matsuda | 361/679.58 |
| 5,761,030 | A | * | 6/1998 | Roscoe | 361/679.58 |
| 6,137,685 | A | * | 10/2000 | Morinaga | 361/727 |
| 6,606,241 | B2 | * | 8/2003 | Moore | 361/679.58 |
| 7,173,815 | B2 | * | 2/2007 | Lee | 361/679.57 |
| 2004/0125554 | A1 | * | 7/2004 | DeLuga | 361/683 |
| 2007/0001559 | A1 | * | 1/2007 | Chen et al. | 312/223.2 |
| 2009/0290303 | A1 | * | 11/2009 | Guo et al. | 361/679.58 |
| 2009/0290304 | A1 | * | 11/2009 | Shen et al. | 361/679.58 |

* cited by examiner

*Primary Examiner* — Jayprakash N Gandhi
*Assistant Examiner* — Anthony Q Edwards
(74) *Attorney, Agent, or Firm* — Winston Hsu; Scott Margo

(57) ABSTRACT

A fixing mechanism includes a housing whereon an opening and a first hole are formed. A first fixing component is disposed on the housing. The fixing mechanism further includes a frame installed inside the housing through the opening for fixing a removable module. A first wedging component is disposed on the frame for wedging with the first fixing component so as to fix the removable module inside the housing. The fixing mechanism further includes a releasing component installed inside the first hole for pressing the first wedging component so as to separate the first wedging component from the first fixing component.

42 Claims, 8 Drawing Sheets

US 8,027,159 B2

FIXING MECHANISM FOR FIXING A REMOVABLE MODULE OF AN ELECTRONIC DEVICE

BACKGROUND OF THE INVENTION

1. Field of the Invention

The present invention relates to a fixing mechanism for fixing a removable module of an electric device, and more particularly, to a fixing mechanism for fixing a removable module of an electric device without utilizing screws.

2. Description of the Prior Art

A computer has to be disassembled for replacing broken components, installing new components, upgrading the components, and so on. The computer with easy disassembly characteristic suits a user's demand. It is also convenient for users to disassemble a storage device, such as a hard disk, from a computer. Generally, most of the hard disc devices of the notebook computer are of removable mechanism design. However, the design still needs to screw components between the removable storage device and a host resulting in difficulty of assembly and increase of labor hour of assembly.

SUMMARY OF THE INVENTION

According to the claimed invention, a fixing mechanism includes a housing whereon an opening and a first hole are formed. A first fixing component is disposed on the housing. The fixing mechanism further includes a frame installed inside the housing through the opening for fixing a removable module. A first wedging component is disposed on the frame for wedging with the first fixing component so as to fix the removable module inside the housing. The fixing mechanism further includes a releasing component installed inside the first hole for pressing the first wedging component so as to separate the first wedging component from the first fixing component.

According to the claimed invention, an electric device includes a removable module, and a fixing mechanism capable of fixing the removable module includes a housing whereon an opening and a first hole are formed. A first fixing component is disposed on the housing. The housing further includes a frame installed inside the housing through the opening for fixing a removable module. A first wedging component is disposed on the frame for wedging with the first fixing component so as to fix the removable module inside the housing. The fixing mechanism further includes a releasing component installed inside the first hole for pressing the first wedging component so as to separate the first wedging component from the first fixing component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
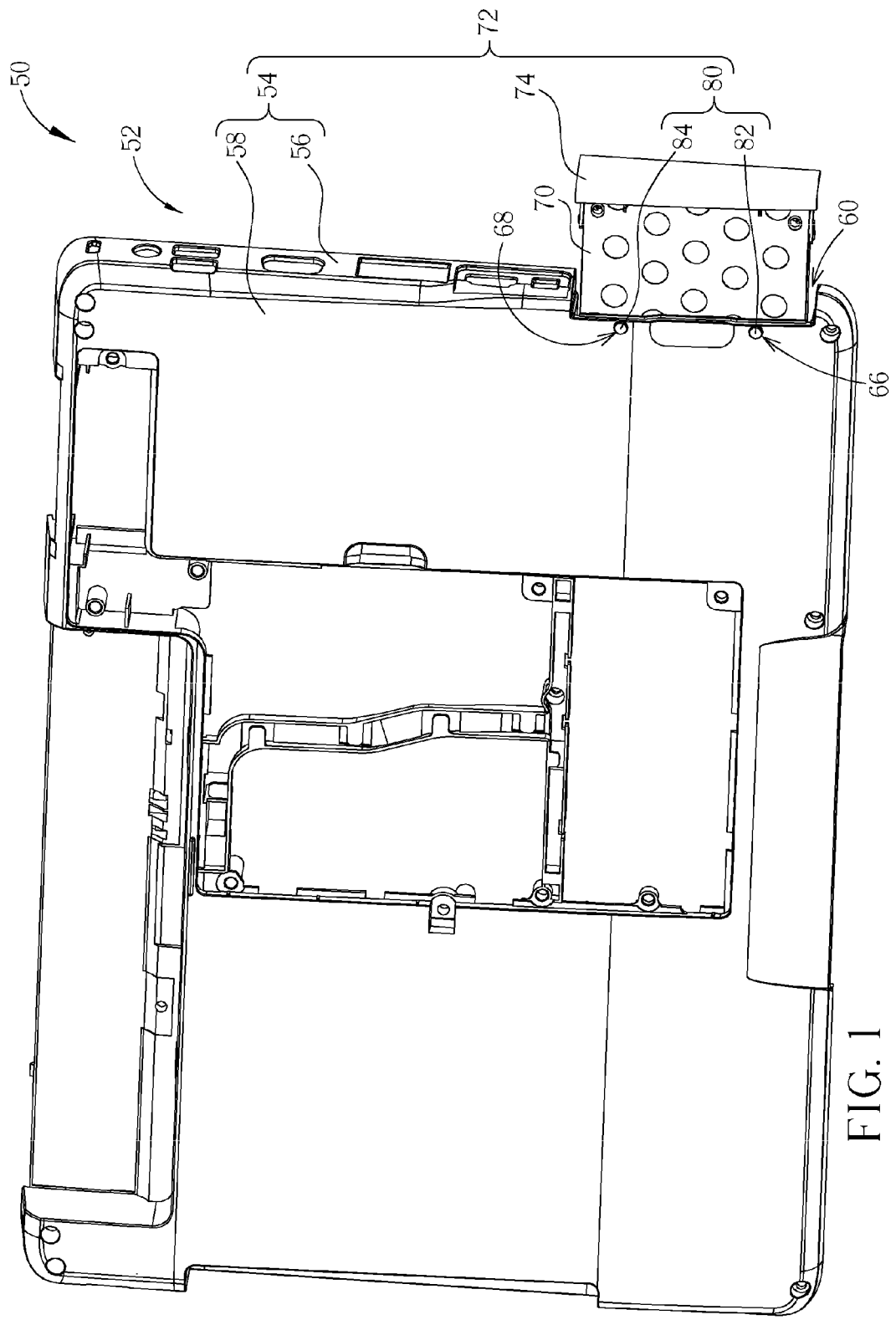
FIG. 1 is a drawing of an electric device according to a preferred embodiment of the present invention.
Figure 2:
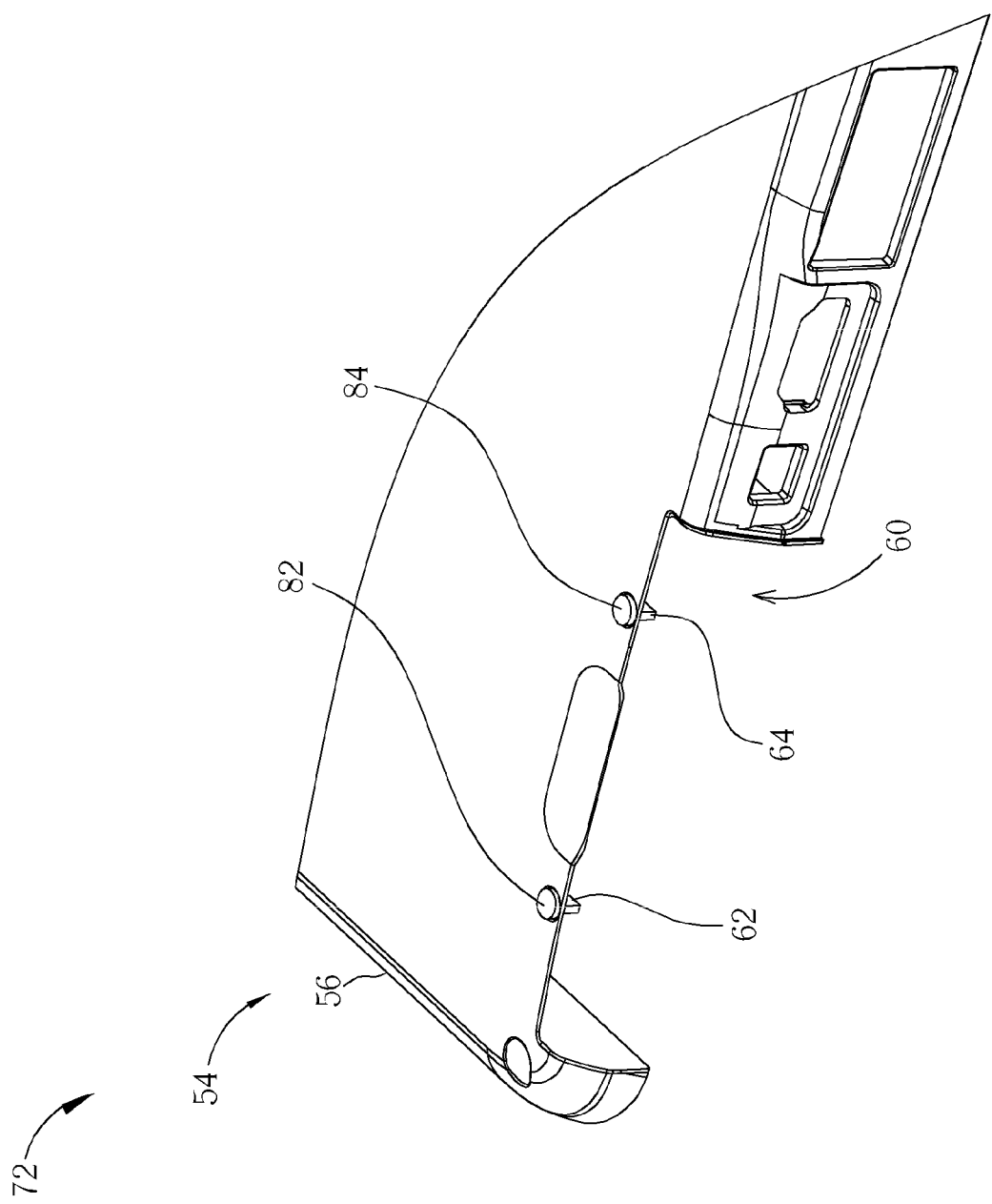
FIG. 2 is a drawing of a housing according to the preferred embodiment of the present invention.
Figure 3:
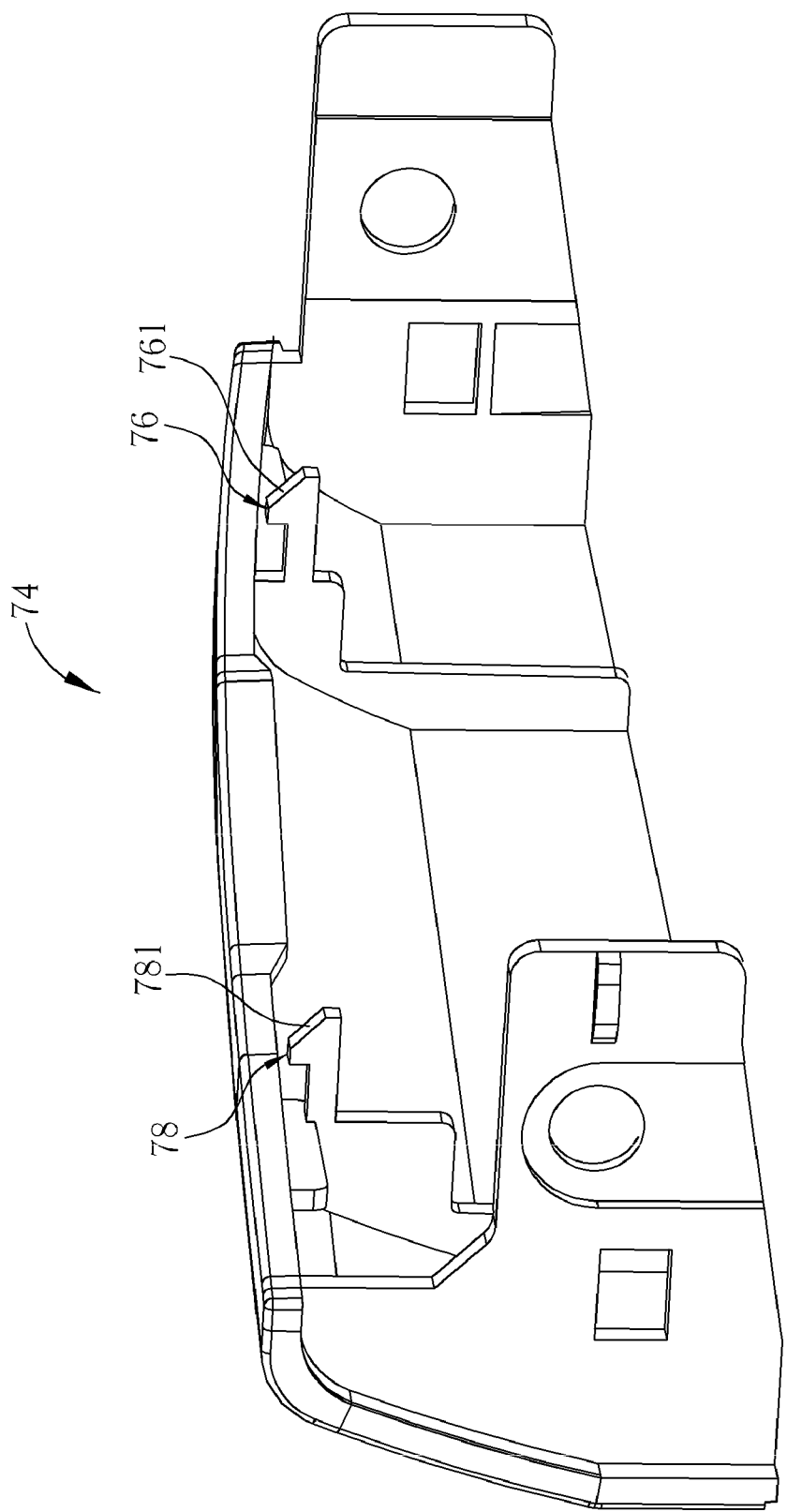
FIG. 3 is a drawing of a frame according to the preferred embodiment of the present invention.

Please refer to FIG. 1. FIG. 1 is a drawing of an electric device 50 according to a preferred embodiment of the present invention. The electric device 50 can be a portable computer, such as a notebook computer. The electric device 50 includes a host 52 including a housing 54 for covering the internal elements. Please refer to FIG. 1 and FIG. 2. FIG. 2 is a drawing of the housing 54 according to the preferred embodiment of the present invention. The housing 54 includes a framework 56, and a lower casing 58 for covering the framework 56. An opening 60, a first fixing component 62, and a second fixing component 64 are disposed on the framework 56. The first fixing component 62 and the second fixing component 64 can be a rib structure respectively. A first hole 66 and a second hole 68 are formed on the lower casing 58 and disposed on positions corresponding to the first fixing component 62 and the second fixing component 64 respectively. The electric device 50 further includes a removable module 70 which can be a storage module, such as a hard disc drive or an optical disk drive. The electric device 50 further includes a fixing mechanism 72 for fixing the removable module 70. The fixing mechanism 72 further includes a frame 74 for fixing the removable module 70. The frame 74 is installed inside the housing 54 through the opening 60 in a detachable manner so that a user can draw the removable module 70 by pulling the frame 74. Please refer to FIG. 3. FIG. 3 is a drawing of the frame 74 according to the preferred embodiment of the present invention. A first wedging component 76 and a second wedging component 78 are disposed on the frame 74 and can be a hook respectively. The first wedging component 76 and the second wedging component 78 are used to wedge with the first fixing component 62 and the second fixing component 64 respectively for fixing the removable module 70 inside the housing 54. An inclined plane 761 and an inclined plane 781 are formed on free ends of the first wedging component 76 and the second wedging component 78 respectively.

Figure 4:
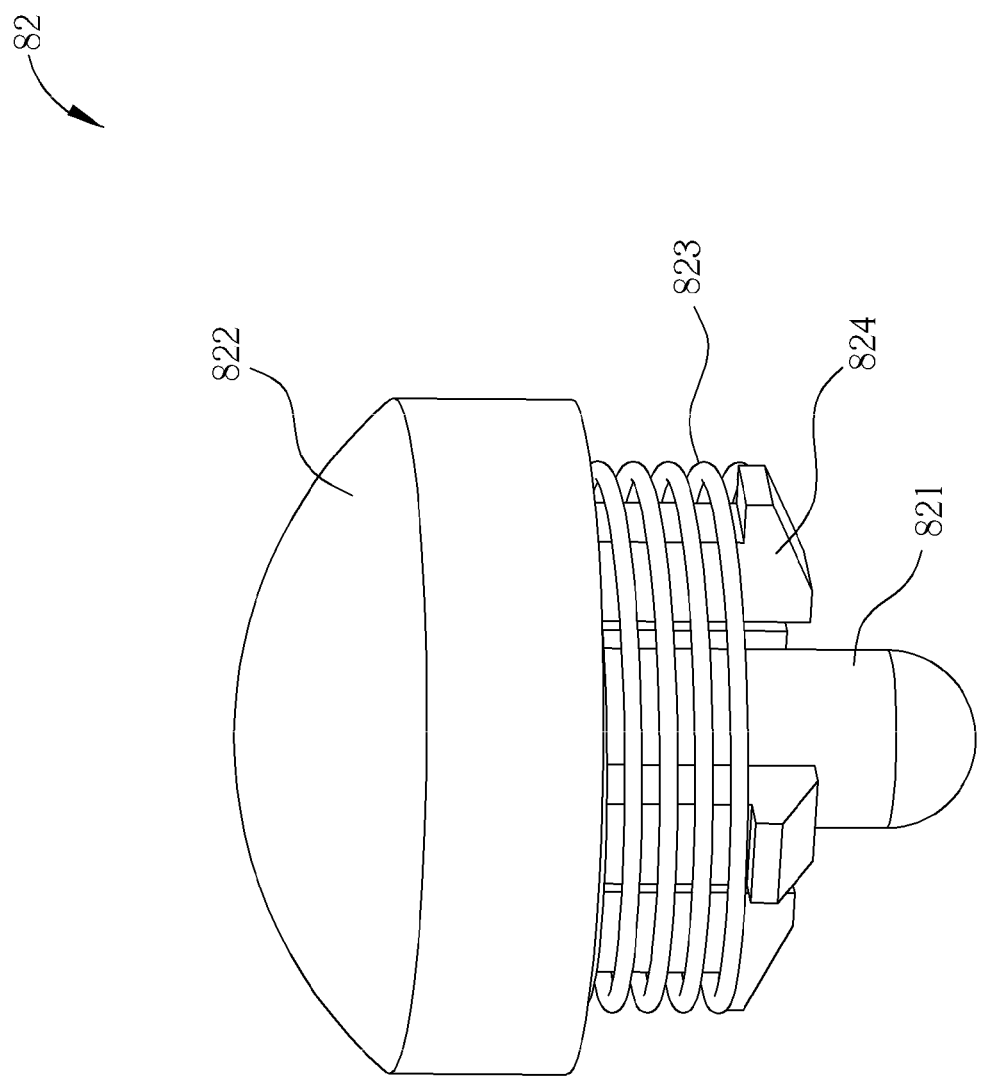
FIG. 4 is a drawing of a first releasing button according to the preferred embodiment of the present invention.
Figure 5:
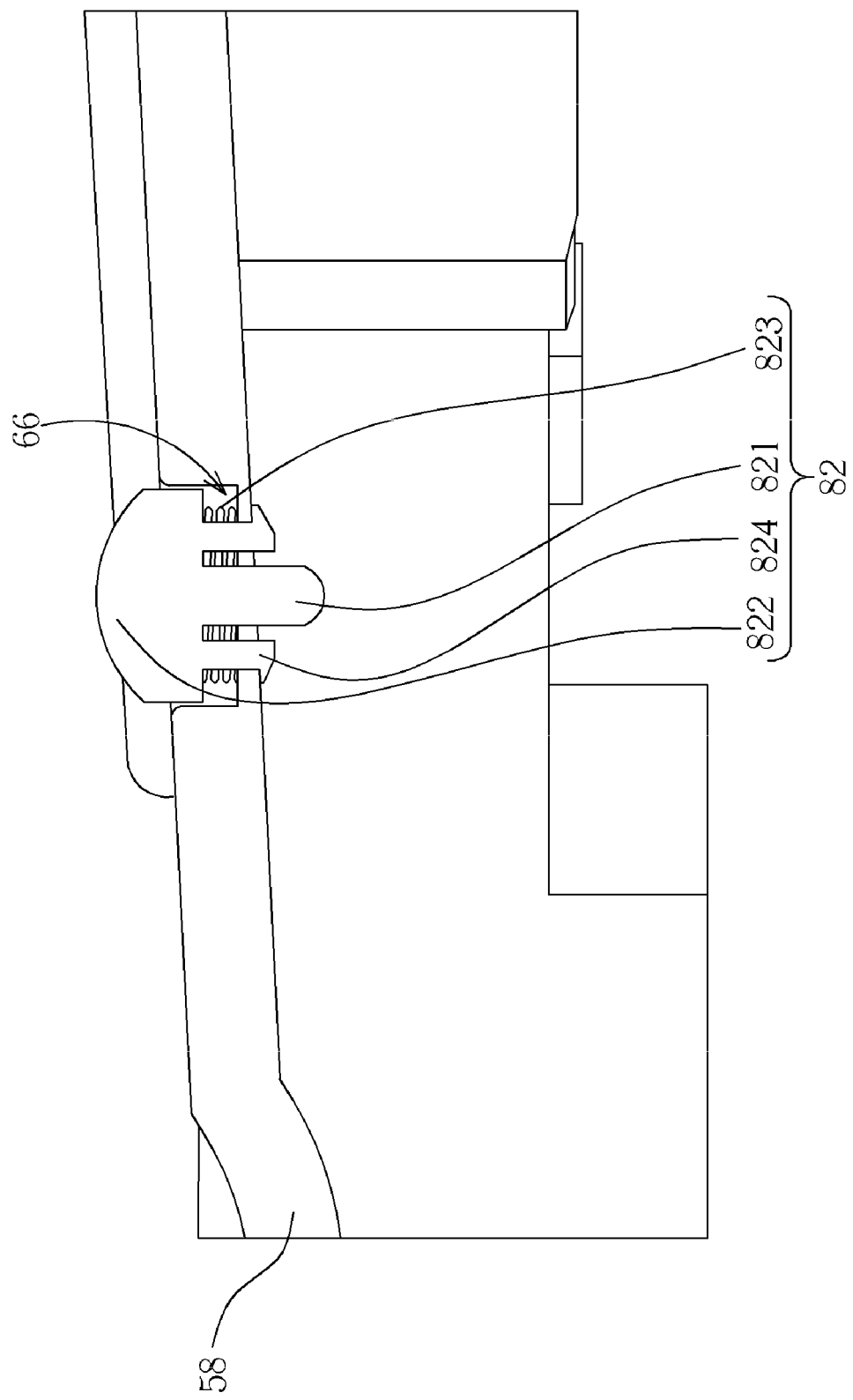
FIG. 5 is a sectional view of the first releasing button wedging inside a first hole according to the preferred embodiment of the present invention.
Figure 6:
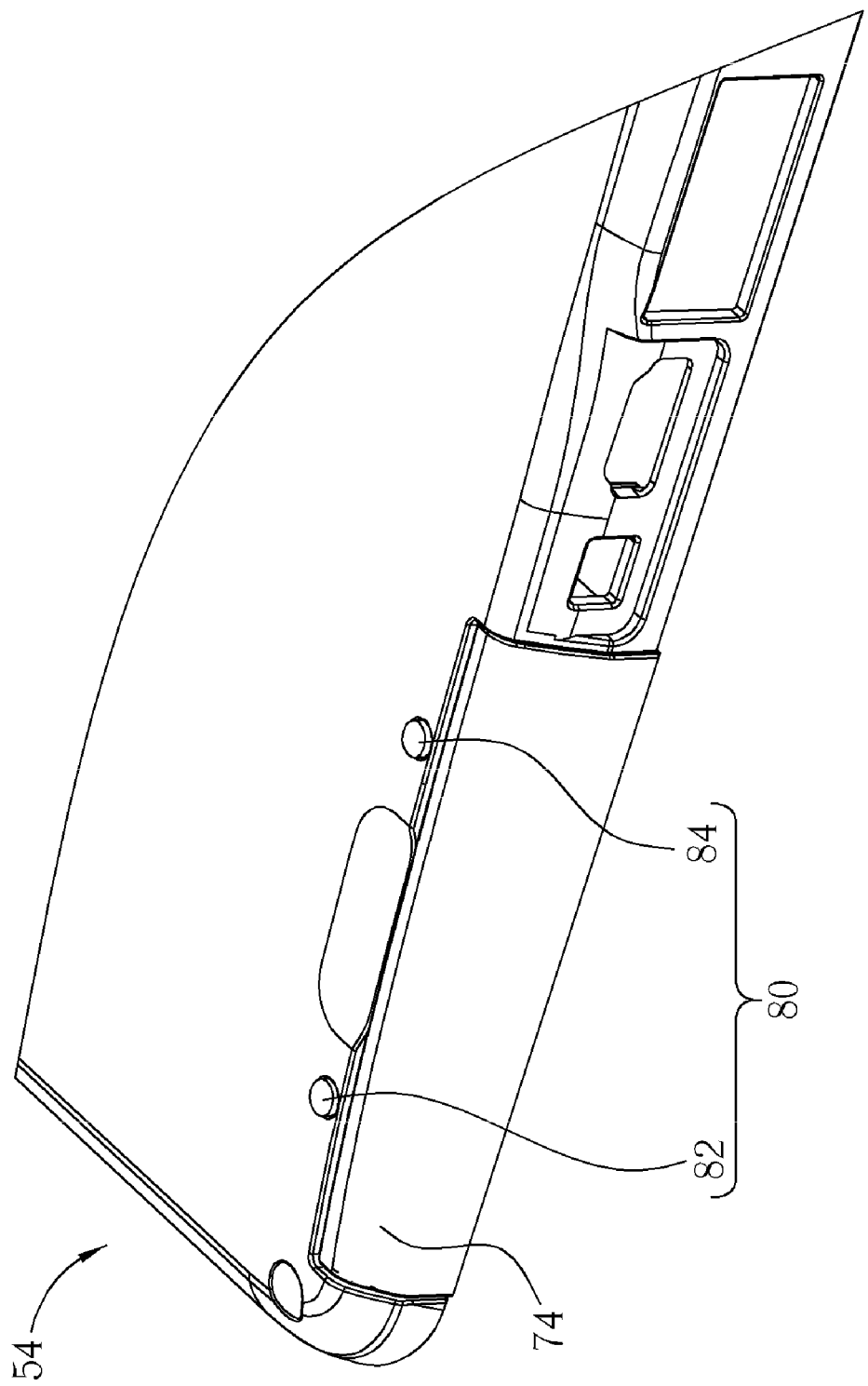
FIG. 6 is a drawing of the frame installed inside the housing according to the preferred embodiment of the present invention.
Figure 7:
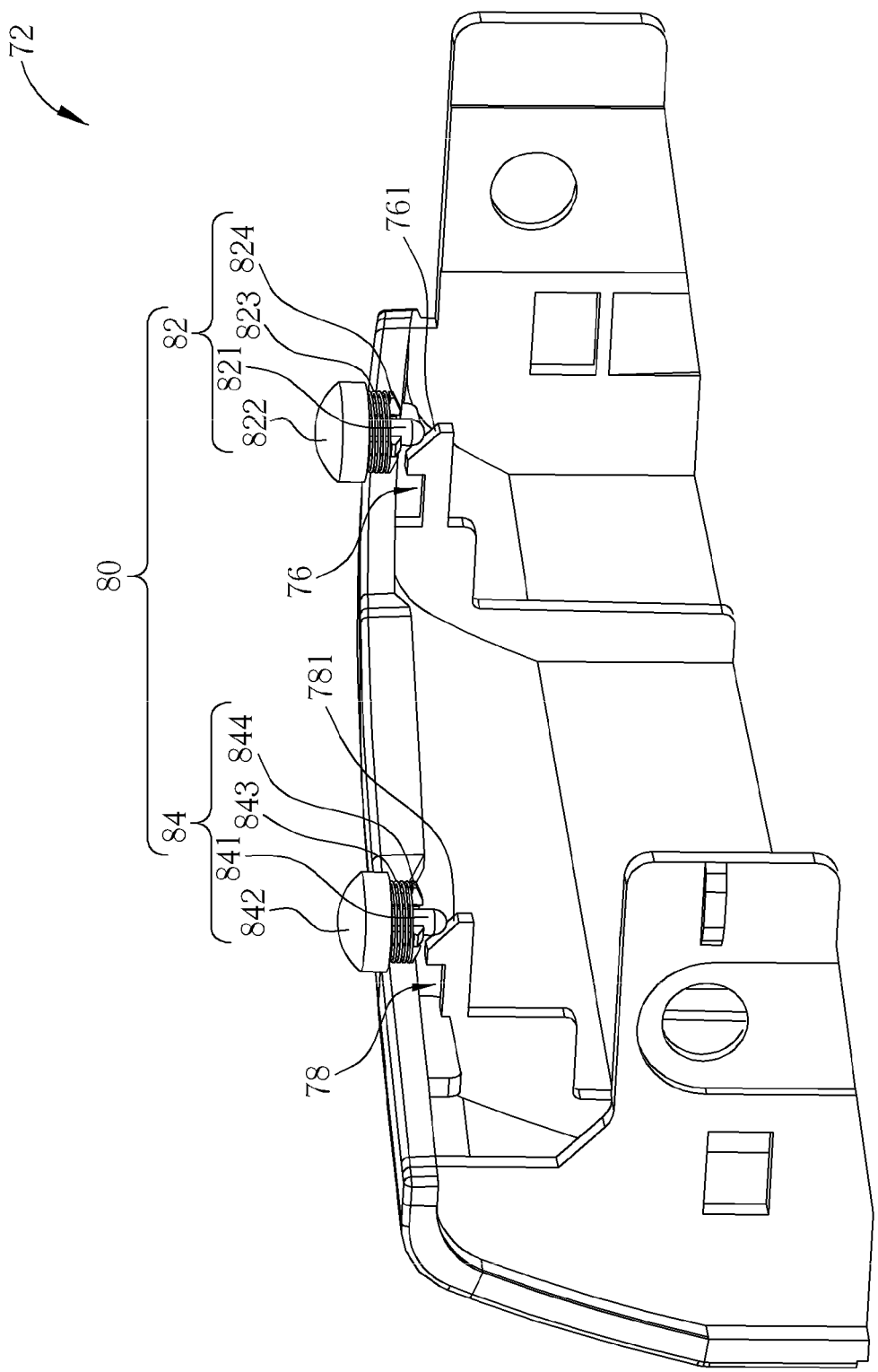
FIG. 7 is a drawing of a releasing component combining with the frame according to the preferred embodiment of the present invention.

The fixing mechanism 72 includes a releasing component 80 including a first releasing button 82 and a second releasing button 84. The first releasing button 82 and the second releasing button 84 are installed inside the first hole 66 and the second hole 68 respectively. Please refer to FIG. 4 to FIG. 7. FIG. 4 is a drawing of the first releasing button 82 according to the preferred embodiment of the present invention. FIG. 5 is a sectional view of the first releasing button 82 wedging inside the first hole 66 according to the preferred embodiment of the present invention. FIG. 6 is a drawing of the frame 74 installed inside the housing 54 according to the preferred embodiment of the present invention. FIG. 7 is a drawing of the releasing component 80 combining with the frame 74 according to the preferred embodiment of the present invention. The first releasing button 82 and the second releasing button 84 include a first bolt 821 and a second bolt 841 respectively for pressing the inclined plane 761 of the first wedging component 76 and the inclined plane 781 of the second wedging component 78 respectively so that the first wedging component 76 and the second wedging component 78 deform respectively. The first releasing button 82 and the second releasing button 84 further include a first dome 822 and a second dome 842 respectively for connecting to a first bolt 821 and a second bolt 841 respectively so as to provide the user to press the first releasing button 82 and the second releasing button 84. The first releasing button 82 further includes a first elastic element 823, and a plurality of the first hooks 824. The second releasing button 84 further includes a second elastic element 843, and a plurality of the second hooks 844. The first elastic element 823 and the second elastic element 843 are sheathed with the first bolt 821 and the second bolt 841 respectively. The plurality of the first hooks 824 and the plurality of the second hooks 844 are installed on the first bolt 821 and the second bolt 841 respectively for fixing the first elastic element 823 and the second elastic element 843 respectively. The first elastic element 823 and the second elastic element 843 can be a spring respectively. The first hook 824 and the second hook 844 can be an elastic structure respectively for wedging inside the first hole 66 and the second hole 68 elastically.

Figure 8:
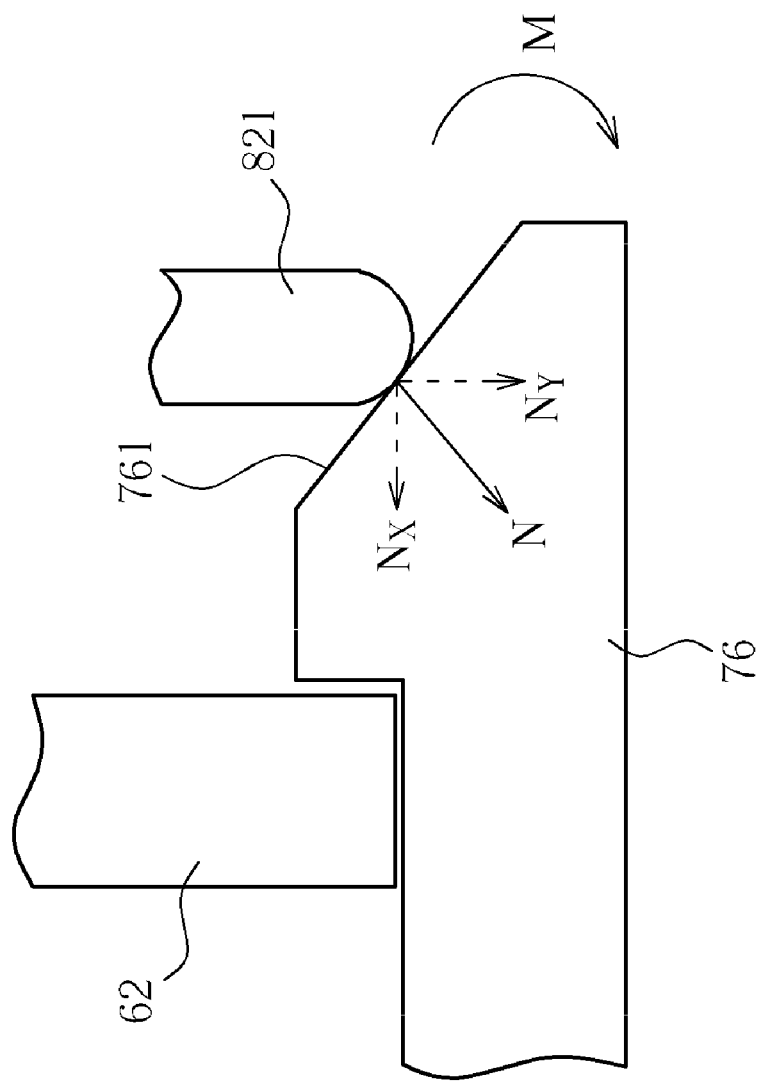
FIG. 8 is a diagram of a first bolt pressing an inclined plane of a first wedging component according to the preferred embodiment of the present invention.

The structures and working principles of the first releasing button 82 and the second releasing button 84 are the same, and the single releasing button is introduced herein for simplicity. The first hook 824 is an elastic structure, so the plurality of the first hooks 824 of the first releasing button 82 can be pressed inwardly so that the first elastic element 823 is sheathed with the plurality of the first hooks 824 for connecting to one side of the first bolt 821. While the plurality of the first hooks 824 are released, the plurality of the first hooks 824 restores outwardly to an original position elastically so that the elastic restoring force can wedge the first elastic element 823 around the first bolt 821 tightly. Then the plurality of the first hooks 824 of the first releasing button 82 is pressed inward again for sheathing inside the first hole 66 so that free ends of the plurality of the first hooks 824 (wedging part) can pass through the first hole 66. As shown in FIG. 5, the plurality of the first hooks 824 restores outwardly to the original position elastically after the free ends of the plurality of the first hooks 824 pass through the first hole 66 so that the first releasing button 82 wedges inside the first hole 66 elastically. While the removable module 70 is fixed inside the housing 52, the first releasing button 82 and the second releasing button 84 can not press the inclined plane 761 of the first wedging component 76 and the inclined plane 781 of the second wedging component 78 respectively. It means the first wedging component 76 and the second wedging component 78 are not deformed. When the user wants to draw the removable module 70 from the housing 52, the user has to press the first releasing button 82 and the second releasing button 84 down simultaneously. The first bolt 821 of the first releasing button 82 and the second bolt 841 of the second releasing button 84 press the inclined plane 761 of the first wedging component 76 and the inclined plane 781 of the second wedging component 78 respectively so that the first wedging component 76 and the second wedging component 78 are deformed. Please refer to FIG. 8. FIG. 8 is a diagram of the first bolt 821 pressing the inclined plane 761 of the first wedging component 76 according to the preferred embodiment of the present invention. While the first bolt 821 presses the inclined plane 761 of the first wedging component 76, the first bolt 821 applies a normal force N on the inclined plane 761 of the first wedging component 76. The normal force N is decomposed into two components of $N_X$ and $N_Y$. The component of $N_Y$ generates a rotating moment M so that the first wedging component 76 deforms relative to a fixed end, then the first wedging component 76 departs from the first fixing component 62. Similarly, the second wedging component 78 departs from the second fixing component 64 so as to release constraint between the frame 74 and the housing 54. At this time, the user can draw the frame 74 for drawing the removable module 70 out. When the user releases the first releasing button 82 and the second releasing button 84, the first elastic element 823 and the second elastic element 843 sheathed with the first bolt 821 and the second bolt 841 respectively can apply the elastic restoring forces to the first dome 822 and the second dome 842 respectively so that the first releasing button 82 and the second releasing button 84 recover to the initial position elastically.

Moreover, the releasing component 80 of the fixing mechanism 72 of the present invention can also include a single releasing button structure. It means that the user only needs to press single releasing button for releasing the constraint of the frame 74. The advantage of using the plurality of releasing buttons can avoid releasing the constrain of the frame 74 accidentally while touching single releasing button unintentionally so as to take out the removable module recklessly. On the other hand, the fixing mechanism with the plurality of releasing buttons can solve the above-mentioned problem by pressing all of the plurality of releasing buttons at the same time for releasing the constraint of the frame 74. Besides, the releasing component 80 of the fixing mechanism 72 of the present invention can also be designed as a structure of single releasing button which is connected to the plurality of bolts for pressing the plurality of wedging components simultaneously. That is, the user presses a single releasing button for releasing the combination between the plurality of wedging components of the frame and the plurality of fixing components of the housing. The working principle is the same as the one of the above-mentioned embodiment, and hereby the detailed description is omitted for simplicity.

In contrast to the prior art, the fixing mechanism of the present invention is capable of fixing the hard disc drive on the housing without utilizing screws. The present invention not only reduces the difficulty in assembly but also saves the labor hour and the cost of assembly components so as to promote convenience of assembly widely.

Those skilled in the art will readily observe that numerous modifications and alterations of the device and method may be made while retaining the teachings of the invention.

What is claimed is:

1. A fixing mechanism comprising:
    a housing whereon an opening and a first hole are formed, a first fixing component being disposed on the housing;
    a frame installed inside the housing through the opening for fixing a removable module, a first wedging component being disposed on the frame for wedging with the first fixing component so as to fix the removable module inside the housing, an inclined plane being formed on an end of the first wedging component; and
    a releasing component installed inside the first hole for pressing the first wedging component so as to separate the first wedging component from the first fixing component, the releasing component comprising a first releasing button comprising a first bolt for pressing the inclined plane of the first wedging component so as to deform the first wedging component.

2. The fixing mechanism of claim 1, wherein the first fixing component is a rib structure.

3. The fixing mechanism of claim 1, wherein the first wedging component is a hook.

4. The fixing mechanism of claim 1, wherein the first releasing button further comprises a first dome connected to the first bolt.

5. The fixing mechanism of claim 1, wherein the first releasing button further comprises:
a first elastic element sheathed with the first bolt; and
at least one first hook installed on the first bolt for fixing the first elastic element.

6. The fixing mechanism of claim 5, wherein the first elastic element is a spring.

7. The fixing mechanism of claim 5, wherein the first hook is an elastic structure for wedging inside the first hole of the housing elastically.

8. The fixing mechanism of claim 1, wherein the housing further comprises a second fixing component, and the frame further comprises a second wedging component for wedging the second fixing component.

9. The fixing mechanism of claim 8, wherein the second fixing component is a rib structure.

10. The fixing mechanism of claim 8, wherein the second wedging component is a hook.

11. The fixing mechanism of claim 10, wherein an inclined plane is formed on an end of the second wedging component.

12. The fixing mechanism of claim 11, wherein the first releasing button further comprises a second bolt for pressing the inclined plane of the second wedging component so as to deform the second wedging component.

13. The fixing mechanism of claim 12, wherein the first releasing button further comprises:
a second elastic element sheathed with the second bolt; and
at least one second hook installed on the second bolt for fixing the second elastic element.

14. The fixing mechanism of claim 13, wherein the second elastic component is a spring.

15. The fixing mechanism of claim 13, wherein a second hole is formed on the housing, and the second hook is an elastic structure for wedging inside the second hole of the housing elastically.

16. The fixing mechanism of claim 11, wherein the releasing component comprises a second releasing button comprising a second bolt for pressing the inclined plane of the second wedging component so as to deform the second wedging component.

17. The fixing mechanism of claim 16, wherein the second releasing button further comprises a second dome connected to the second bolt.

18. The fixing mechanism of claim 16, where the second releasing button further comprises:
a second elastic element sheathed with the second bolt; and
at least one second hook installed on the second bolt for fixing the second elastic element.

19. The fixing mechanism of claim 18, wherein a second hole is formed on the housing, and the second hook is an elastic structure for wedging inside the second hole of the housing elastically.

20. The fixing mechanism of claim 1, wherein the housing comprises a framework and a lower casing for covering the framework, the opening and the first fixing component are formed on the framework, and the first hole is formed on the lower casing.

21. An electronic device comprising:
a removable module; and
a fixing mechanism for fixing the removable module comprises:
a housing whereon an opening and a first hole are formed, a first fixing component being disposed on the housing
a frame installed inside the housing through the opening for fixing the removable module, a first wedging component being disposed on the frame for wedging with the first fixing component so as to fix the removable module inside the housing, an inclined plane being formed on an end of the first wedging component; and
a releasing component installed inside the first hole for pressing the first wedging component so as to separate the first wedging component from the first fixing component, the releasing component comprising a first releasing button comprising a first bolt for pressing the inclined plane of the first wedging component so as to deform the first wedging component.

22. The electronic device of claim 21, wherein the first fixing component is a rib structure.

23. The electronic device of claim 21, wherein the first wedging component is a hook.

24. The electronic device of claim 21, wherein the first releasing button further comprises a first dome connected to the first bolt.

25. The electronic device of claim 21, wherein the first releasing button further comprises:
a first elastic element sheathed with the first bolt; and
at least one first hook installed on the first bolt for fixing the first elastic element.

26. The electronic device of claim 25, wherein the first elastic element is a spring.

27. The electronic device of claim 25, wherein the first hook is an elastic structure for wedging inside the first hole of the housing elastically.

28. The electronic device of claim 21, wherein the housing further comprises a second fixing component, and the frame further comprises a second wedging component for wedging the second fixing component.

29. The electronic device of claim 28, wherein the second fixing component is a rib structure.

30. The electronic device of claim 28, wherein the second wedging component is a hook.

31. The electronic device of claim 30, wherein an inclined plane is formed on an end of the second wedging component.

32. The electronic device of claim 31, wherein the first releasing button further comprises a second bolt for pressing the inclined plane of the second wedging component so as to deform the second wedging component.

33. The electronic device of claim 32, wherein the first releasing button further comprises:
a second elastic element sheathed with the second bolt; and
at least one second hook installed on the second bolt for fixing the second elastic element.

34. The electronic device of claim 33, wherein the second elastic element is a spring.

35. The electronic device of claim 33, wherein a second hole is formed on the housing, the second wedging hook is an elastic structure for wedging inside the second hole of the housing elastically.

36. The electronic device of claim 31, wherein the releasing component comprises a second releasing button comprising a second bolt for pressing the inclined plane of the second wedging component so as to deform the second wedging component.

37. The electronic device of claim 36, wherein the second releasing button further comprises a second dome connected to the second bolt.

38. The electronic device of claim 36, wherein the second releasing button further comprises:

a second elastic element sheathed with the second bolt; and
at least one second hook installed on the second bolt for fixing the second elastic element.

39. The electronic device of claim 38, wherein a second hole is formed on the housing, and the second wedging hook is an elastic structure for wedging inside the second hole of the housing elastically.

40. The electronic device of claim 38, wherein the removable module is a storage module.

41. The electronic device of claim 40, wherein the removable module is a hard disc or an optical disk driver.

42. The electronic device of claim 21, wherein the housing comprises a framework and a lower casing for covering the framework, the opening and the first fixing component are formed on the framework, and the first hole is formed on the lower casing.

* * * * *